No. 674,728. Patented May 21, 1901.
T. W. BRYANT.
TRUCK FRAME FOR ROLLER SKATES.
(Application filed Feb. 25, 1901.)
(No Model.)
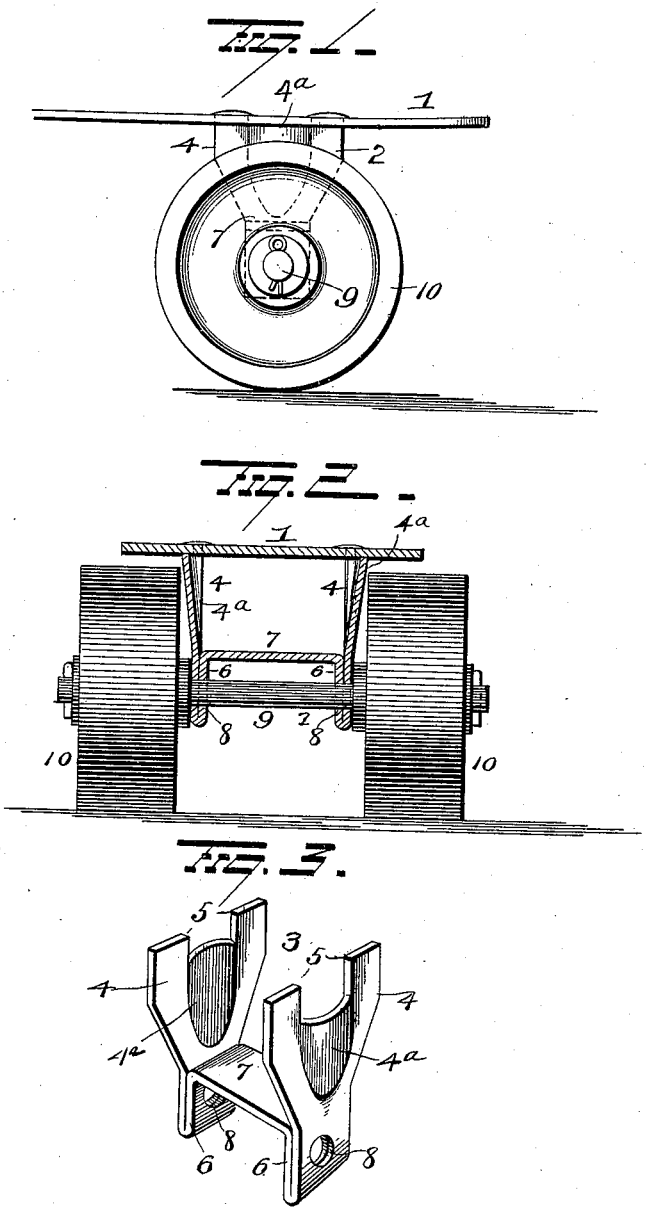
WITNESSES
INVENTOR
Attorney

UNITED STATES PATENT OFFICE.

THOMAS W. BRYANT, OF TORRINGTON, CONNECTICUT.

TRUCK-FRAME FOR ROLLER-SKATES.

SPECIFICATION forming part of Letters Patent No. 674,728, dated May 21, 1901.

Application filed February 25, 1901. Serial No. 48,807. (No model.)

*To all whom it may concern:*

Be it known that I, THOMAS W. BRYANT, of Torrington, in the county of Litchfield and State of Connecticut, have invented certain new and useful Improvements in Truck-Frames for Roller-Skates; and I do hereby declare the following to be a full, clear, and exact description of the invention, such as will enable others skilled in the art to which it appertains to make and use the same.

My invention relates to an improvement in roller-skates, and more particularly to an improved truck frame or hanger, one object of the invention being to provide a truck frame or hanger which shall be simple in construction, cheap to manufacture, and easy to secure to the foot-plate of a skate.

A further object is to produce a sheet-metal truck or hanger frame for roller-skates which shall possess adequate rigidity and afford ample extent of bearing-surface for the axle.

With these objects in view the invention consists in certain novel features of construction and combinations and arrangements of parts, as hereinafter set forth, and pointed out in the claims.

In the accompanying drawings, Figure 1 is a side elevation of a portion of a roller-skate embodying my invention. Fig. 2 is a transverse section with axle and wheel in elevation. Fig. 3 is a perspective view of the truck frame or hanger.

1 represents a portion of the foot-plate of a skate, and 2 one of the trucks, and it is the frame or hanger 3 of said truck wherein my invention resides. The truck-frame is constructed of sheet-steel and preferably in a single piece. It comprises parallel vertical arms or hangers 4, broadened at their upper ends and provided at the ends of said broadened portions with lugs 5, to be passed through holes in the foot-plate 1, and when upset upon the latter constituting rivets securing the frame or hanger to the foot-plate. The intermediate portions of the arms 4 are bulged or made with corrugations 4ª, the upper ends of which between the lugs 5 have flat bearings against said foot-plate, and thus form broad bearings for the arms or hangers against the latter. The intermediate portion of the sheet-metal blank from which the frame or hanger is made is bent upward between the arms 4 to form short members 6, disposed flat against the inner faces of said arms, and an intermediate portion 7, connecting the upper ends of the members 6 and constituting a brace between the depending arms of the frame. The members 6 coöperate with the lower portions of the arms 4 to produce double thicknesses of metal, which not only serve to strengthen the lower portions of the frame, but also enable the provision of broad bearings 8 for the axle 9, on which the wheels 10 are mounted.

My improvements, though simple and cheap in construction, result in the production of a sheet-metal truck frame or hanger having ample rigidity to withstand all the strain which might come upon it and is not liable to become in the least degree distorted or displaced.

Having fully described my invention, what I claim as new, and desire to secure by Letters Patent, is—

1. A truck frame or hanger comprising parallel depending arms, the lower end of each bent upon itself to form an increased thickness at the lower portion adapted for the reception of an axle, and a brace connecting said depending arms in proximity to the axle-bearings.

2. A truck frame or hanger comprising parallel depending arms bent upon themselves at their lower ends to form lower thickened portions provided with axle-bearings and a brace connecting the arms at the upper ends of said thickened portions and in proximity to the axle-bearings.

3. A sheet-metal truck frame or hanger, comprising parallel arms, short members integral with said arms and disposed against the faces of the arms at the lower ends thereof, said arms and short members having alined bearings for an axle.

4. A truck frame or hanger for a skate, comprising parallel arms, short members disposed against the inner faces of said arms at their lower ends, said arms and short members having alined bearings for an axle, and an integral brace connecting the upper ends of said short members.

5. A truck frame or hanger comprising parallel arms provided at their upper ends with lugs to form rivets for securing the device to a foot-plate, short members disposed against the inner faces of the arms at their lower ends, said arms and short members having bearings for an axle and a brace connecting the lower portions of said arms.

6. A truck frame or hanger consisting of a single piece of sheet metal bent to form parallel arms, the intermediate portion of said piece of sheet metal bent up between said arms a short distance and forming two short members integral with said arms and lying against the same and an integral brace connecting said short members, said arms and short members having alined bearings for an axle, and means at the upper ends of the parallel arms by means of which to secure them to a foot-plate.

7. A truck-frame comprising two arms or hangers bent upon themselves at their lower ends to form two short members disposed against the lower portions of said arms, a brace connecting said short members, said arms or hangers provided at their upper ends with lugs and the body of each arm or hanger being bulged or corrugated between said lugs to form laterally-extended bearings for the arms or hangers against the foot-plate of the skate.

In testimony whereof I have signed this specification in the presence of two subscribing witnesses.

THOMAS W. BRYANT.

Witnesses:
  WM. H. BRONSON,
  FR. V. SPIELKAN.